(12) United States Patent
Mei

(10) Patent No.: US 12,727,702 B2
(45) Date of Patent: Sep. 8, 2026

(54) POT COVER ASSEMBLY AND COOKING UTENSIL

(71) Applicant: FOSHAN SHUNDE MIDEA ELECTRICAL HEATING APPLIANCES MANUFACTURING CO., LTD., Foshan (CN)

(72) Inventor: Ruoyu Mei, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 896 days.

(21) Appl. No.: 17/994,243

(22) Filed: Nov. 25, 2022

(65) Prior Publication Data

US 2023/0355026 A1 Nov. 9, 2023

(30) Foreign Application Priority Data

May 7, 2022 (CN) ......................... 202221100232.0

(51) Int. Cl.
*A47J 27/08* (2006.01)
*A47J 27/086* (2006.01)

(52) U.S. Cl.
CPC ......... *A47J 27/0813* (2013.01); *A47J 27/086* (2013.01)

(58) Field of Classification Search
CPC ....... A47J 27/0813; A47J 27/086; A47J 36/10
See application file for complete search history.

(56) References Cited

U.S. PATENT DOCUMENTS 6,257,124 B1 * 7/2001 Chen ................... A47J 27/0813 220/325
2005/0284305 A1 * 12/2005 Angue ................ A47J 27/0808 99/337
2007/0169637 A1 * 7/2007 Lee ..................... A47J 27/0813 99/337
2016/0198883 A1 * 7/2016 Wang ........................ A23L 5/10 426/231
2018/0116438 A1 * 5/2018 He .......................... A47J 36/10
2020/0128997 A1 * 4/2020 Qin ..................... A47J 27/0804
2020/0405086 A1 * 12/2020 Dos Santos ........... A47J 27/086
2021/0000292 A1 * 1/2021 Siu ........................ A47J 27/086
2021/0259453 A1 * 8/2021 Newhouse .............. A47J 36/16
2022/0354293 A1 * 11/2022 Yang ....................... A47J 27/09
2024/0057804 A1 * 2/2024 Yeom .................. A47J 27/0813
2024/0206668 A1 * 6/2024 Xie ..................... A47J 27/0813
2024/0277176 A1 * 8/2024 Yeom ...................... A47J 36/10
2025/0185836 A1 * 6/2025 Turpin .................... A47J 36/10

* cited by examiner

*Primary Examiner* — Aaron R Eastman
(74) *Attorney, Agent, or Firm* — Anova Law Group, PLLC

(57) ABSTRACT

A pot cover assembly includes a cover body, a retractable member movably provided inside the cover body, and a driver assembly. The retractable member has, in a movement stroke of the retractable member, a locking position for locking a pot body and an unlocking position for unlocking the pot body. The driver assembly includes a driver member rotatably provided outside the cover body along an axis extending in a thickness direction of the cover body and a transmission mechanism transmissively connecting the driver member and the retractable member. The transmission mechanism is configured to convert a rotation of the driver member into a movement of the retractable member.

19 Claims, 12 Drawing Sheets

POT COVER ASSEMBLY AND COOKING UTENSIL

CROSS-REFERENCE TO RELATED APPLICATION

This application claims priority to Chinese Patent Application No. 202221100232.0, filed on May 7, 2022, the entire contents of which are incorporated herein by reference.

TECHNICAL FIELD

The present disclosure relates to the technical field of household appliances, and in particular, to a pot cover assembly and a cooking utensil.

BACKGROUND

Nowadays, there are many types of mechanisms used to open and close the pot cover of a pressure cooker. Pressure cookers mainly include drop-lid pressure cookers, rotate-to-close pressure cookers, and clamp-type pressure cookers. The rotate-to-close pressure cooker is the most widely used because of its simple structure, easiness to manufacture and low cost. At present, ordinary circular pressure cookers generally adopt a twist-type rotation means. During use, the joints of the user's wrist need to be twisted to open the pot cover, which is inconvenient to operate.

SUMMARY

The main objective of the present disclosure is to provide a pot cover assembly and a cooking utensil, which aims to solve the problem of inconvenient operation caused by the ordinary circular pressure cooker adopting the twist-type rotation means that requires the joints of the user's wrist to be twisted to open the pot cover during use.

In order to achieve the above objective, the present disclosure provides a pot cover assembly, including: a cover body, a retractable member movably provided inside the cover body, and a driver assembly.

The retractable member has a locking position for locking a pot body and an unlocking position for unlocking the pot body in a movement stroke of the retractable member.

The driver assembly includes a driver member that is rotatably provided outside the cover body along an axis extending in a thickness direction of the cover body, and a transmission mechanism transmissively connecting the driver member and the retractable member, and the transmission mechanism is configured to convert a rotation of the driver member into a movement of the retractable member.

In some embodiments, the retractable member is rotatably mounted inside the cover body, the transmission mechanism includes a drive slot and a drive column matching the drive slot, the drive slot extends in a direction that forms an included angle with a line passing through a center of the retractable member, and is in an elongated shape, and one of the drive slot and the drive column is provided at the driver member, and the other of the drive slot and the drive column is provided at the retractable member.

In some embodiments, the retractable member is rotatably mounted inside the cover body, and the transmission mechanism includes: a driving gear member drivingly connected to the driver member to be driven to rotate by the driver member; and a driven gear member drivingly connected to the retractable member and meshed with the driving gear member to drive the retractable member to rotate.

In some embodiments, the driving gear member includes a driving body and a plurality of driving teeth provided at a side of the driving body, the driving body is drivingly connected to the driver member, the driven gear member includes a driven body and a plurality of driven teeth provided at a side of the driven body, the driven body is drivingly connected to the retractable member, and some of the plurality of driven teeth are selectively meshed with some of the plurality of driving teeth.

In some embodiments, the retractable member is provided with two rotation-stop members spaced apart from each other, a side of the driving body is provided with a limit member, and the limit member selectively abuts against one of the two rotation-stop members in a rotation stroke of the limit member.

In some embodiments, the driver member matches the driving gear member through a pin-hole structure to prevent relative rotation; and/or the driven gear member matches the retractable member through a pin-hole structure to prevent relative rotation.

In some embodiments, a handle is provided outside the cover body, and the driver member is rotatably mounted at the handle.

In some embodiments, the driver member has two operation sides in a rotation direction thereof, and the two operation sides of the driver member are provided with anti-slip structures.

In some embodiments, the handle includes a connection member protruding from an outer side of the cover body, and a hold member extending laterally from the connection member, and one end of the driver member is rotatably mounted at the connection member.

In some embodiments, the driver member is located inside the hold member.

In some embodiments, a width of the driver member gradually increases in a direction away from an end of the driver member that is rotatably mounted with the connection member.

In some embodiments, the retractable member includes an inner cover rotatably mounted inside the cover body, and a periphery of the inner cover is provided with buckle teeth for engaging with the pot body, and the transmission mechanism is configured to convert the rotation of the driver member into a rotation of the inner cover.

The present disclosure further provides a cooking utensil, including a pot cover assembly. The pot cover assembly includes a cover body, a retractable member movably provided inside the cover body, and a driver assembly.

The retractable member has a locking position for locking a pot body and an unlocking position for unlocking the pot body in a movement stroke of the retractable member.

The driver assembly includes a driver member that is rotatably provided outside the cover body along an axis extending in a thickness direction of the cover body, and a transmission mechanism transmissively connecting the driver member and the retractable member, and the transmission mechanism is configured to convert a rotation of the driver member into a movement of the retractable member.

In some embodiments, the cooking utensil is an electric pressure cooker.

In technical solutions of the present disclosure, the driver member is rotatably provided outside the cover body along the axis extending in the thickness direction of the cover body. In order to make the retractable member switch between the locking position and the unlocking position, the operator can push the driver member to rotate by finger. Thus, during the process of switching between the locking position and the unlocking position, the joint of the operator's wrist is prevented from twisting to open the pot cover, and the operation is convenient and fast.

BRIEF DESCRIPTION OF THE DRAWINGS

In order to more clearly illustrate the technical solutions in the embodiments of the present disclosure, the following briefly introduces the accompanying drawings that need to be used in the description of the embodiments. Obviously, the drawings in the following description are only some embodiments of the present disclosure. For those of ordinary skill in the art, other drawings can also be obtained based on the structures shown in these drawings without any creative effort.

The realization of the purpose, functional characteristics and advantages of the present disclosure will be further described with reference to the accompanying drawings in conjunction with the embodiments.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

If there is a directional indication involved in the embodiment of the present disclosure, the directional indication is only used to explain the relative positional relationship, movement situation, etc., between the components under a certain attitude. If the specific attitude changes, the directional indication changes accordingly.

In addition, if there are descriptions involving "first," "second," etc., in the embodiments of the present disclosure, "first," "second," etc., are for descriptive purposes only, and should not be construed as indicating or implying their relative importance or implying the number of indicated technical features. Thus, features associated with "first" or "second" may expressly or implicitly include at least one such feature. In addition, the meaning of "and/or" appearing throughout the text includes three parallel schemes. For example, A and/or B includes A, or B, or both A and B. Besides, the technical solutions of the various embodiments can be combined with each other.

The present disclosure provides a pot cover assembly and a cooking utensil. FIG. 1 to FIG. 10 show specific embodiments of the pot cover assembly and the cooking utensil provided by the present disclosure.

Figure 1:
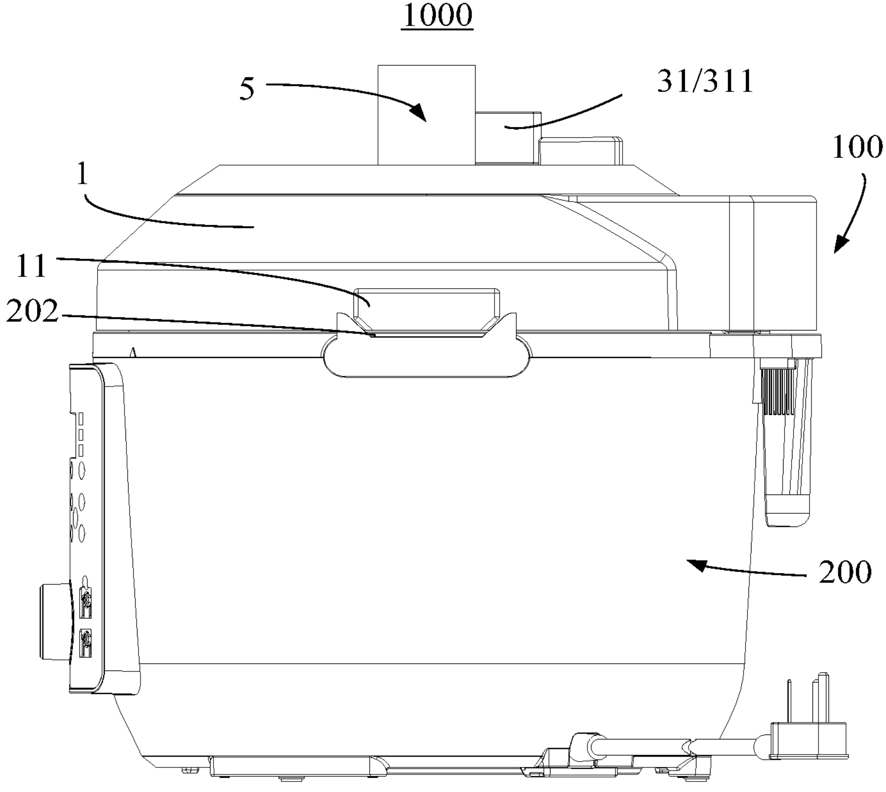
FIG. 1 is a schematic structural diagram of a cooking utensil according to an embodiment of the present disclosure.
Figure 2:
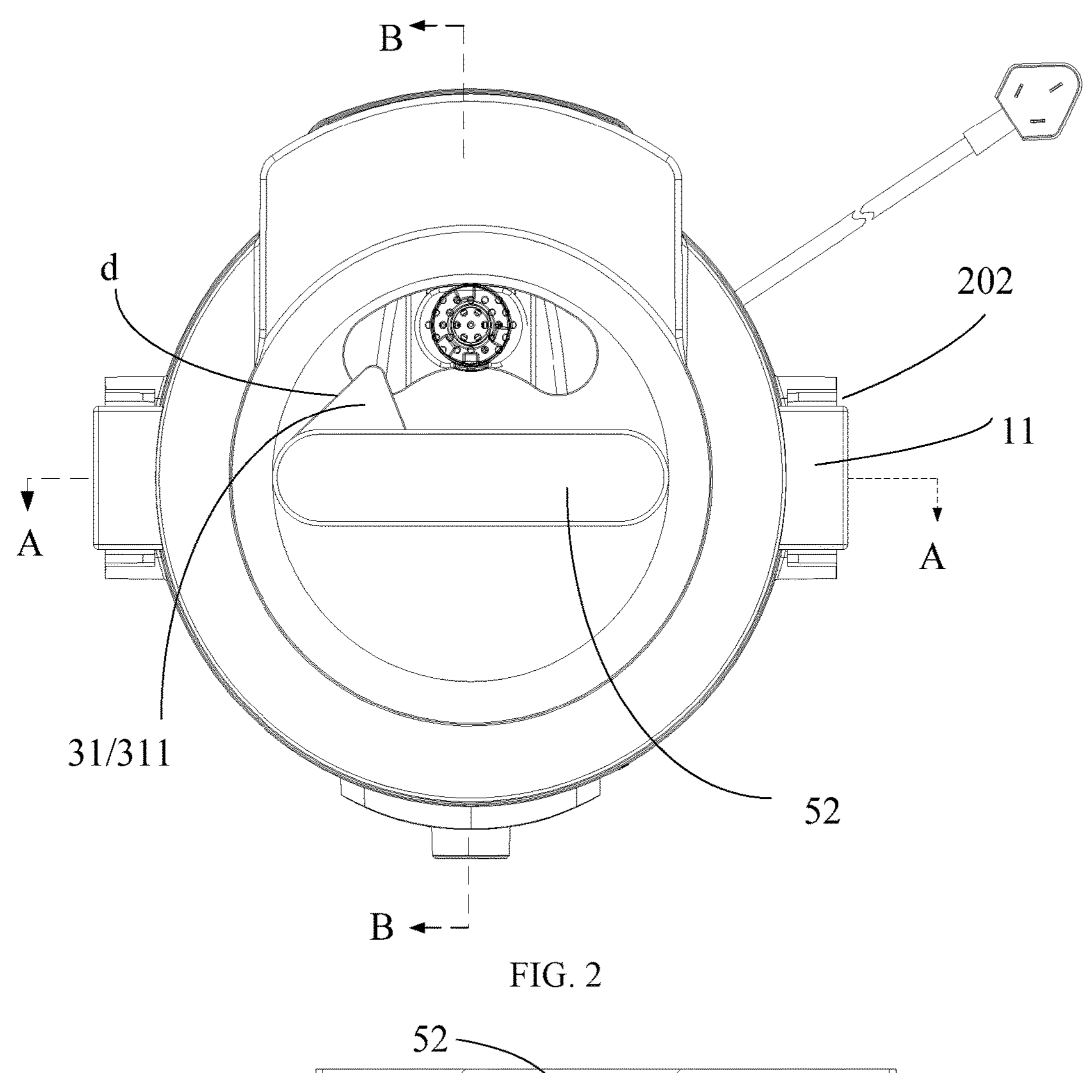
FIG. 2 is a schematic structural diagram of a pot cover assembly in FIG. 1 according to an embodiment of the present disclosure.
Figure 3:
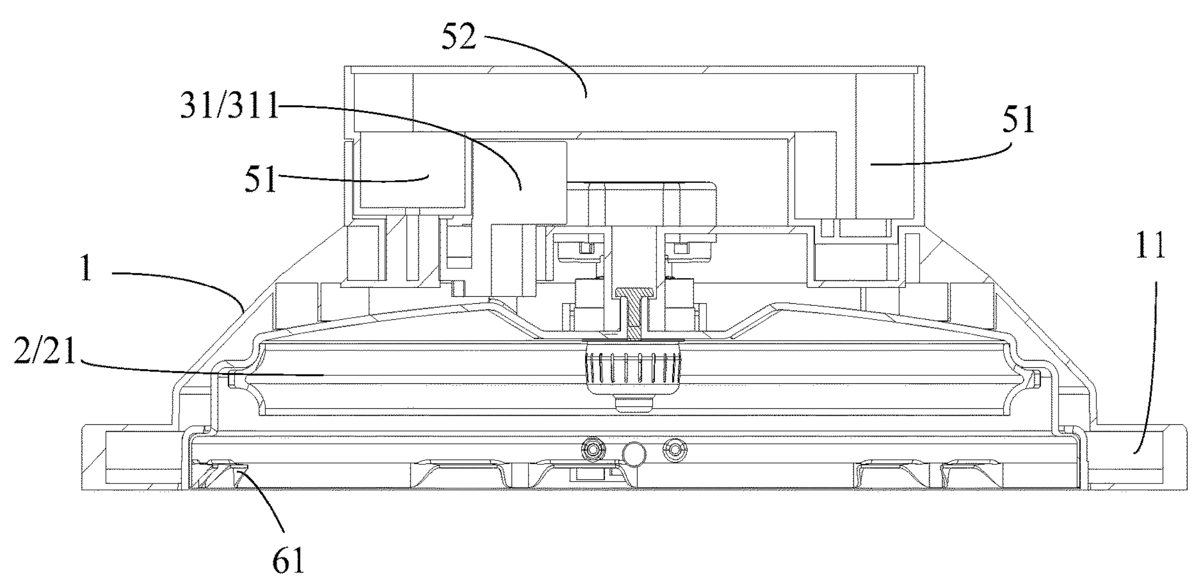
FIG. 3 is a schematic sectional view taken along A-A in FIG. 2.

As shown in FIG. 1 and FIG. 3, a pot cover assembly 100 includes a cover body 1, a retractable member 2, and a driver assembly. The retractable member 2 is movably provided inside the cover body 1. The retractable member 2 has a locking position for locking a pot body 200 and an unlocking position for unlocking the pot body 200 in a movement stroke of the retractable member 2. The driver assembly includes a driver member 31 that is rotatably provided outside the cover body 1 along an axis extending in a thickness direction of the cover body 2, and a transmission mechanism transmissively connecting the driver member 31 and the retractable member 2, and the transmission mechanism is configured to convert a rotation of the driver member 31 into a movement of the retractable member 2.

In technical solutions of the present disclosure, since the driver member 31 is rotatably provided outside the cover body 1 along the axis extending in the thickness direction of the cover body 1, the operator can push the driver member 31 to rotate by fingers. Thus, the retractable member 2 is switched between the locking position and the unlocking position. During the switching process, the joints of the operator's wrist do not need to be twisted, and the operation is convenient and fast.

Figure 8:
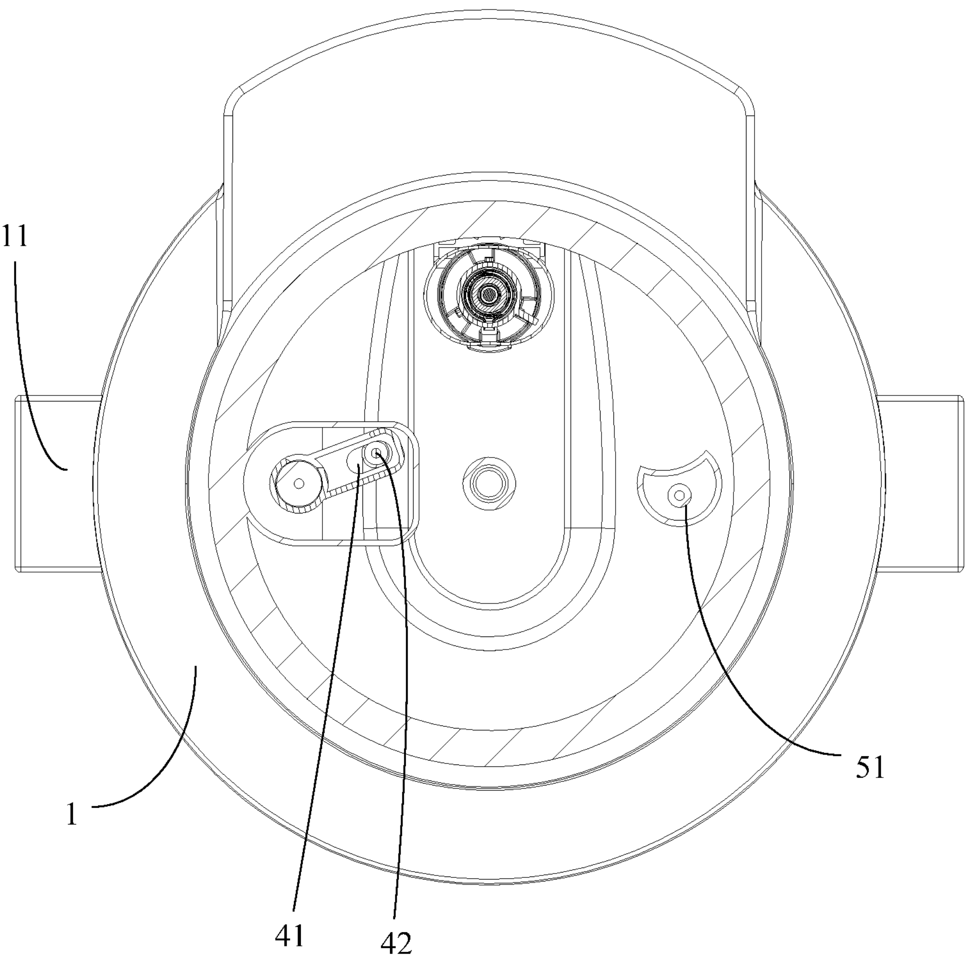
FIG. 8 is a schematic sectional view taken along C-C in FIG. 7.
Figure 9:
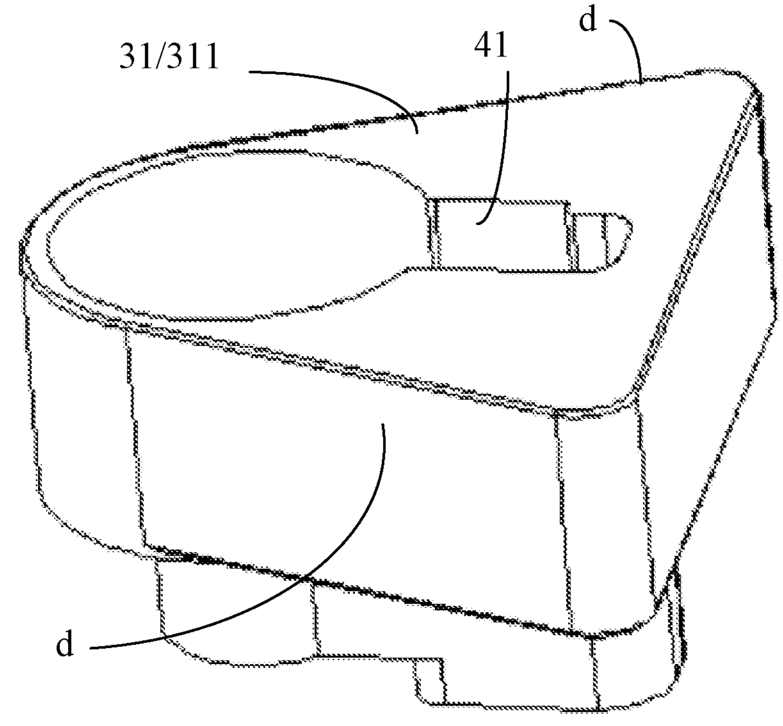
FIG. 9 is a schematic structural diagram of a driver assembly in FIG. 2.
Figure 10:
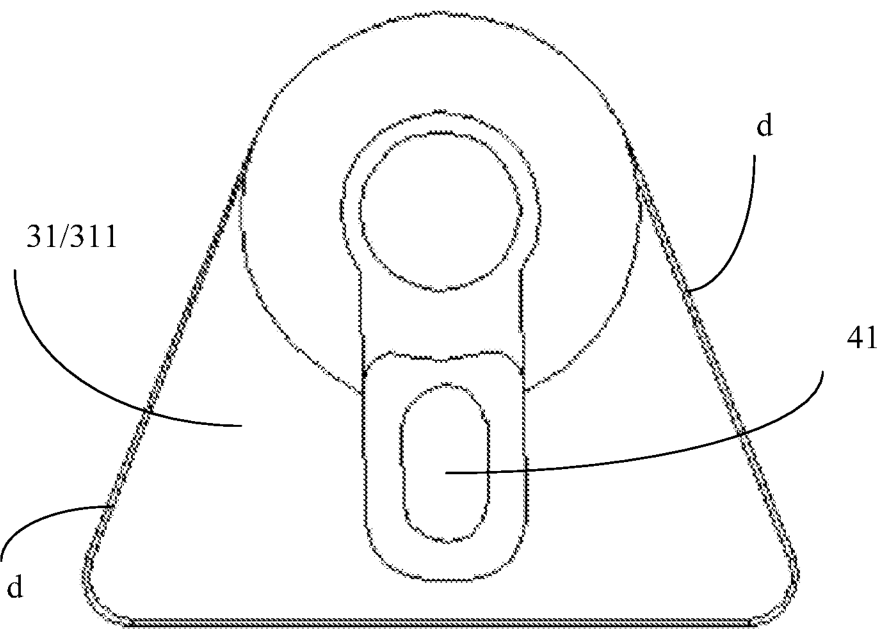
FIG. 10 is a schematic top view of a driver assembly in FIG. 2.

There are various types of the transmission mechanism configured to convert the rotation of the driver member 31 into the movement of the retractable member 2. For example, the transmission mechanism may include a connecting rod that is rotatably mounted inside the cover body around the axis of the cover body 1. One end of the connecting rod is connected to the driver member. The other end of the connecting rod is connected to the retractable member. As another example, the transmission mechanism may include a structure including a gear and a rack cooperating with each other, the rack is connected to the driver member, and the gear is connected to the retractable member. As shown in FIG. 3 and FIG. 8, in an embodiment of the present disclosure, the retractable member 2 is rotatably installed inside the cover body 1, the transmission mechanism includes a drive slot 41 and a drive column 42, and the drive column 42 matches the drive slot 41. The drive slot 41 extends in a direction that forms an included angle with a line passing through a center of the retractable member 2, and is in an elongated shape. The drive column 42 is movably inserted in the drive slot 41. Rotation of the driver member 31 can cause the drive slot 41 or the drive column 42 provided at the driver member 31 to rotate, thereby driving the drive column 42 or the drive slot 41 provided at the retractable member 2 to move. Thus, the rotation of the driver member 31 is converted into the rotation of the retractable member 2, so the structure is simple and the operation is convenient.

Figure 11:
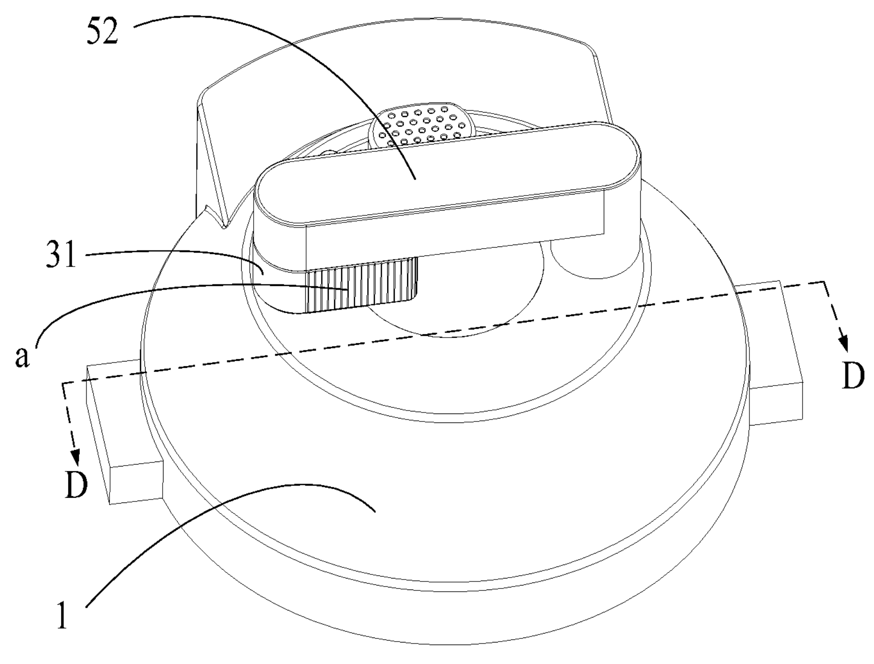
FIG. 11 is a schematic structural diagram of a pot cover assembly in FIG. 1 according to another embodiment of the present disclosure.
Figure 12:
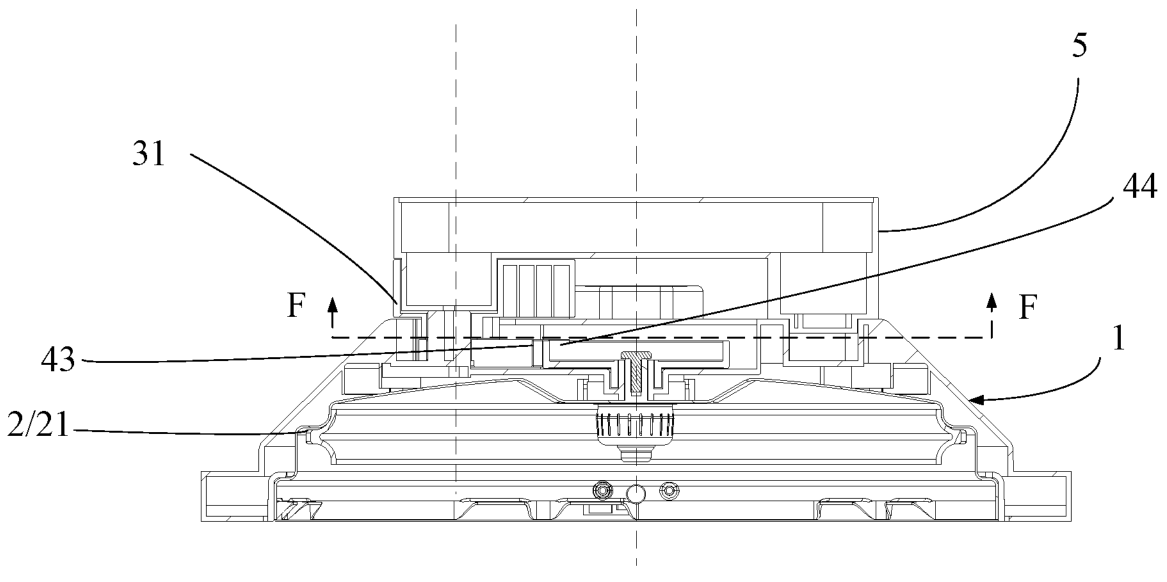
FIG. 12 is a schematic sectional view taken along D-D in FIG. 11.
Figure 13:
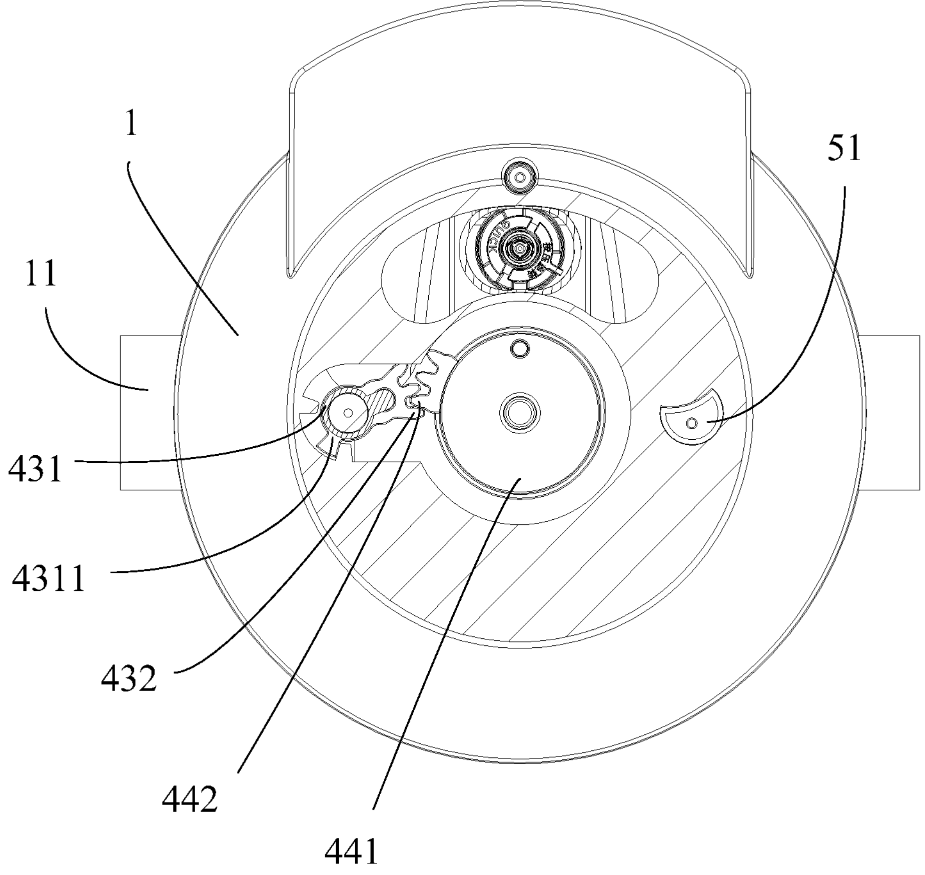
FIG. 13 is a schematic sectional view taken along F-F in FIG. 12.

As shown in FIG. 11 to FIG. 13, in an embodiment of the present disclosure, the retractable member 2 is rotatably mounted at the inner side of the cover body. The transmission mechanism includes a driving gear member 43 and a driven gear member 44. The driving gear member 43 is drivingly connected to the driver member 31. When the driver member 31 rotates, the driving gear member 43 can be driven to rotate. The driven gear member 44 is drivingly connected to the retractable member 2 and meshes with the driving gear member 43. Thus, when the driving gear member 43 rotates, the driven gear member 44 is driven to rotate, and the driven gear member 44 rotates to drive the retractable member 2 to rotate, so the operation is convenient and the structure is compact.

The driver member 31 matches the driving gear member 43 through a pin-hole structure to prevent relative rotation, so that the driver member 31 and the driving gear member 43 can rotate synchronously.

The driven gear member 44 matches the retractable member 2 through a pin-hole structure to prevent relative rotation, so that the driven gear member 44 and the retractable member 2 can rotate synchronously.

As shown in FIG. 13 to FIG. 17, in an embodiment of the present disclosure, a first rotation shaft 312 is protruded from an upper end surface of the driver member 31. A first through hole 3121 is formed through the first rotation shaft 312 in the up-down direction. The retractable member 2 is provided with a first mounting column 22. The driver member 31 is rotatably sleeved on the first mounting column 22 through the first through hole 3121. The driving gear member 43 is provided with a first mounting hole 433. The driving gear member 43 is rotatably sleeved on the first rotation shaft 312 through the first mounting hole 433. Thus, the driving gear member 43 matches the driver member 31 through the pin holes. The retractable member 2 is provided with a second rotation shaft 23. The driven gear member 44 is also provided with a second through hole 443. The driven gear member 44 is rotatably sleeved on the retractable member 2 through the second through hole 443. Thus, the driven gear member 44 matches the retractable member 2 through pin holes, and the structure is simple and compact.

Figure 14:
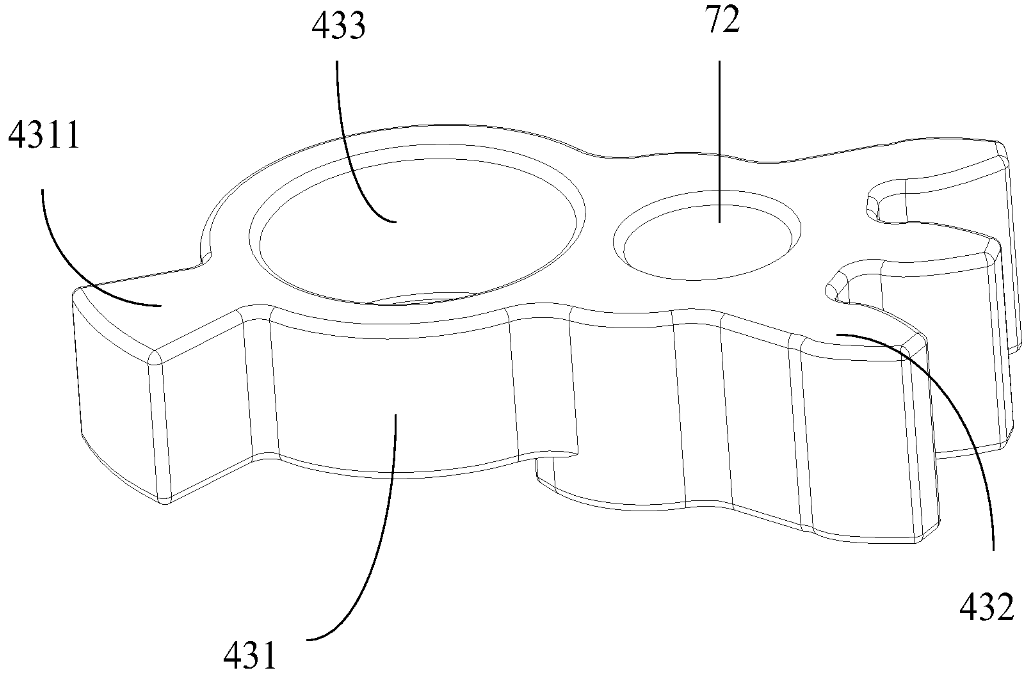
FIG. 14 is a schematic structural diagram of a driving gear member in FIG. 11.
Figure 15:
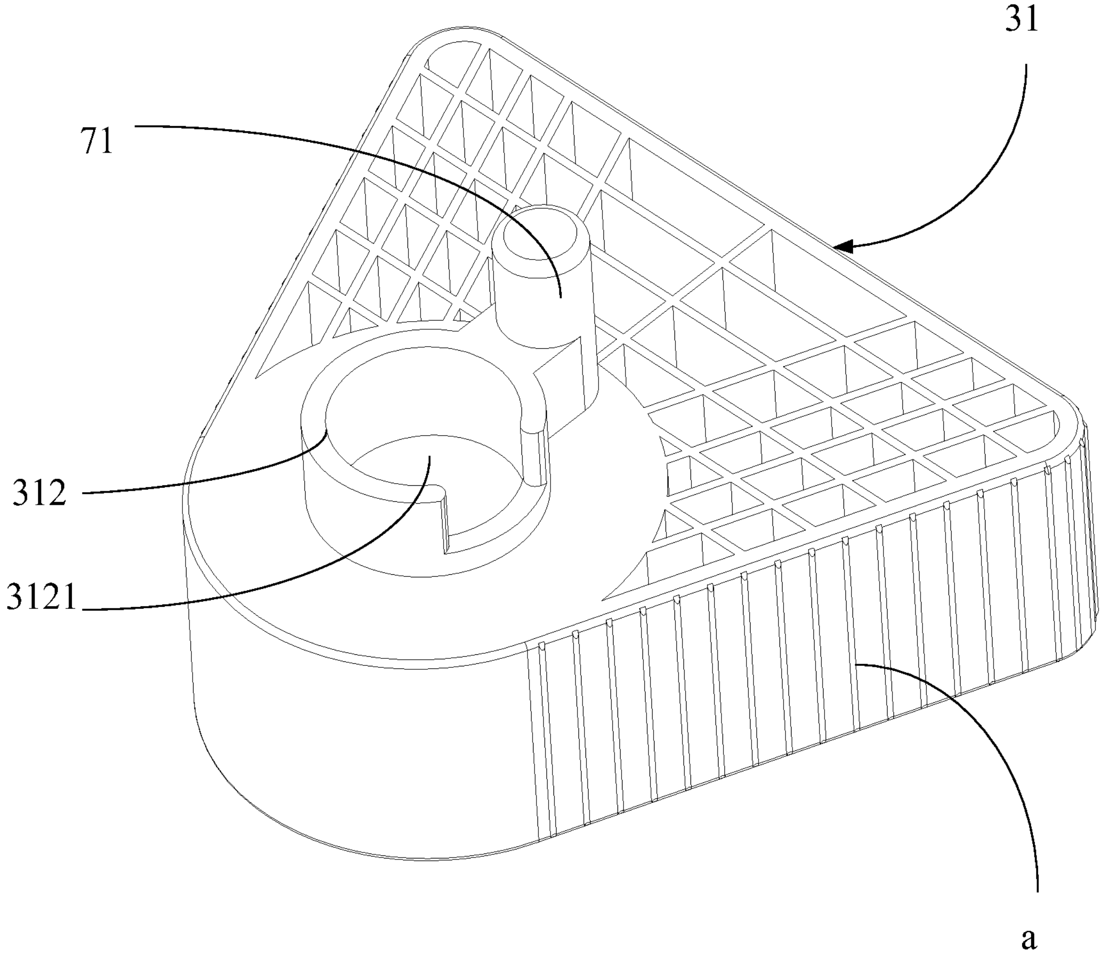
FIG. 15 is a schematic structural diagram of a driver member in FIG. 11.

Further, in order to realize the anti-rotation cooperation between the driver member 31 and the driving gear member 43, as shown in FIG. 13 to FIG. 15, a first anti-rotation structure is provided between the driver member 31 and the driving gear member 43. The first anti-rotation structure includes a first anti-rotation column away from the rotation axis of the driver member 31 and a first anti-rotation hole 72 matching the first anti-rotation column 71. One of the first anti-rotation hole 72 and the first anti-rotation column 71 is provided at the driver member 31, and the other of the first anti-rotation hole 72 and the first anti-rotation column 71 is provided at the driving gear member 43. The first anti-rotation column 71 cooperates with the first anti-rotation hole 72, such that the driver member 31 rotates synchronously with the driving gear member 43, and the structure is simple and compact.

Figure 16:
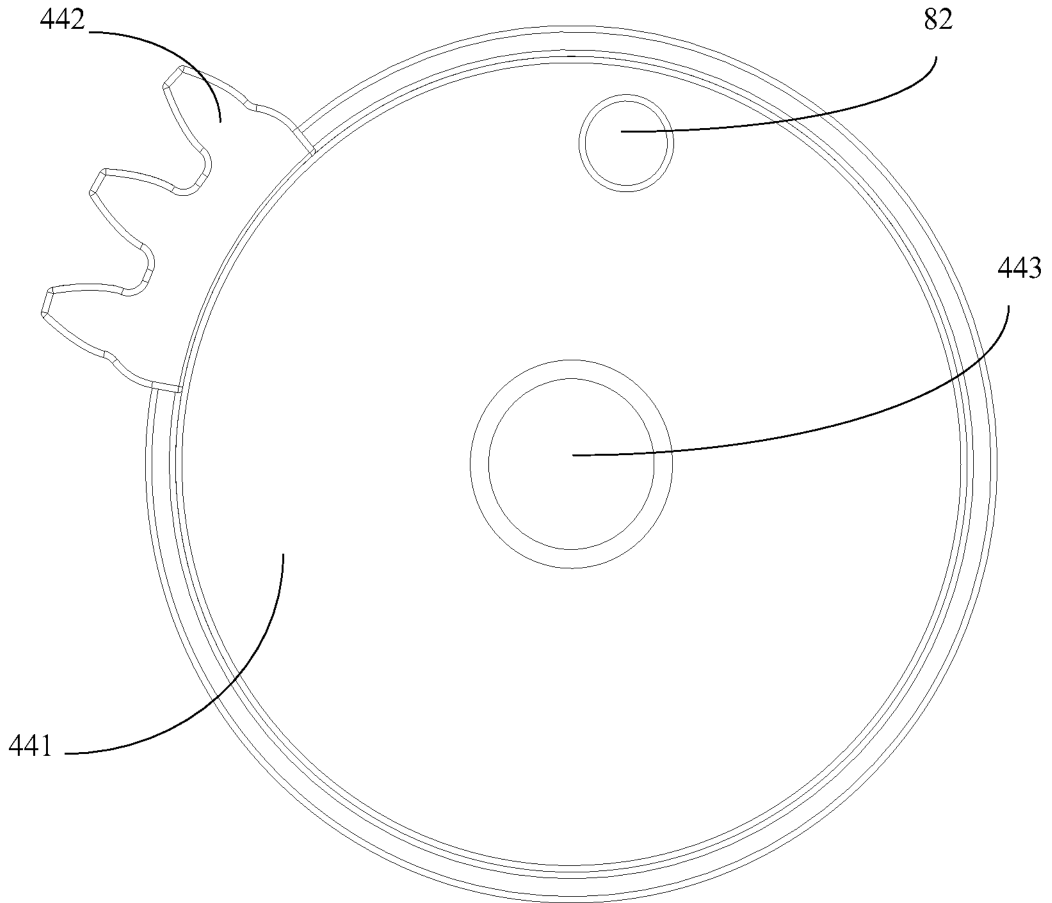
FIG. 16 is a schematic structural diagram of a driven gear member in FIG. 11.
Figure 17:
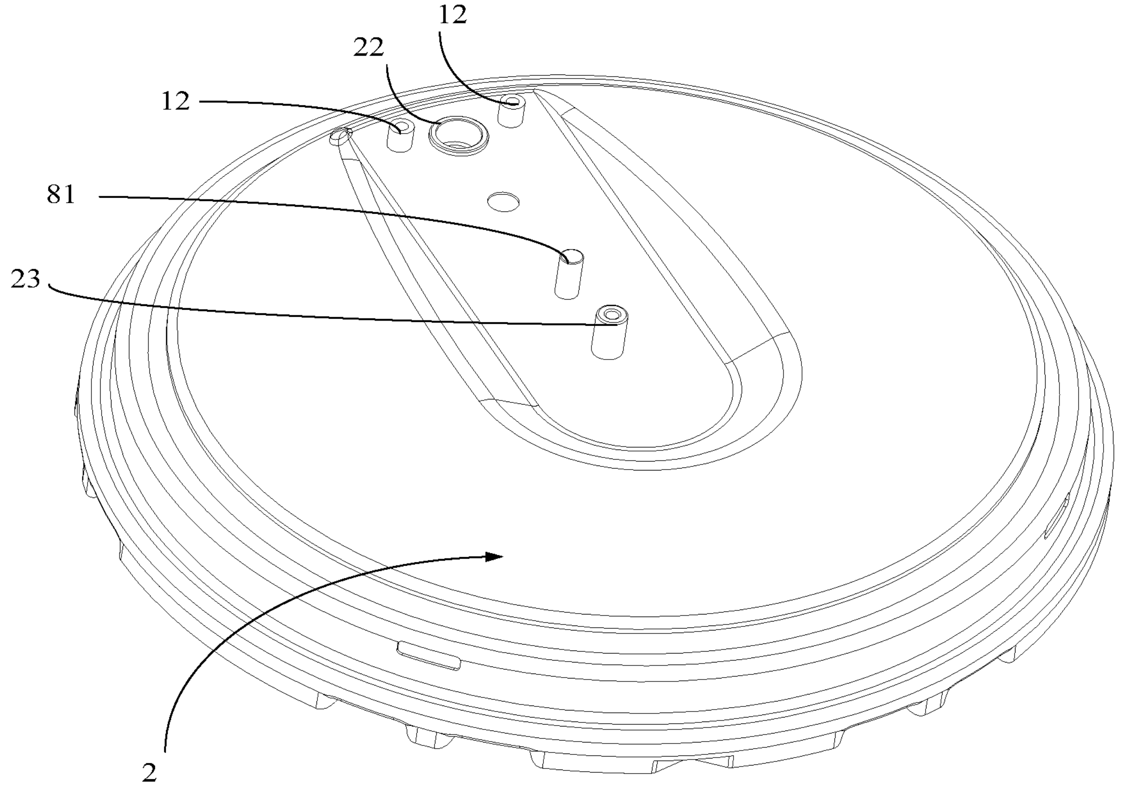
FIG. 17 is a schematic structural diagram of a retractable member in FIG. 11.

In order to realize the anti-rotation cooperation between the driven gear member 44 and the retractable member 2, as shown in FIG. 13, FIG. 16 and FIG. 17, a second anti-rotation structure is provided between the driven gear member 44 and the retractable member 2. The second anti-rotation structure includes a second anti-rotation column 81 away from the rotation axis of the retractable member 2 and a second anti-rotation hole 82 matching the second anti-rotation column 81. One of the second anti-rotation hole 82 and the second anti-rotation column 81 is provided at the retractable member 2, and the other of the second anti-rotation hole 82 and the second anti-rotation column 81 is provided at the driven gear member 44. The second anti-rotation column 81 cooperates with the second anti-rotation hole 82, such that the driven gear member 44 rotates synchronously with the retractable member 2, and the structure is simple and compact.

As shown in FIG. 14 to FIG. 16, the driving gear member 43 includes a driving body 431 and a plurality of driving teeth 432 provided at a side of the driving body 431. The driving body 431 is drivingly connected to the driver member 31. The driven gear member 44 includes a driven body 441 and a plurality of driven teeth 442 provided at a side of the driven body 441, the driven body 441 is drivingly connected to the retractable member 2, and some of the plurality of driven teeth 442 are selectively meshed with some of the plurality of driving teeth 432. Since the driving body 431 is drivingly connected to the driver member 31, when the driver member 31 rotates, the driving body 431 is driven to rotate. When the driving body 431 rotates, some of the plurality of driving teeth 432 provided at the side of the driving body 431 are selectively engaged with some of the plurality of driven teeth 442, so that the driven body 441 is rotated. Since the driven body 441 is drivingly connected to the retractable member 2, when the driven body 441 rotates, the retractable member 2 is driven to rotate, to make the retractable member 2 switch between the locking position and the unlocking position.

As shown in FIG. 14 and FIG. 17, in order to prevent the driving gear member 43 and the driven gear member 44 from being disengaged during the rotation, the retractable member 2 is provided with two rotation-stop members 12 spaced apart from each other. A side of the driving body 431 is provided with a limit member 4311, and the limit member 4311 selectively abuts against one of the two rotation-stop members 12 in a rotation stroke of the limit member, to limit the rotation stoke of the driving body 431. Thus, during the rotation stroke of the driving body 431, some of the plurality of driving teeth 432 can always engage with some of the plurality of driven teeth 442, so as to avoid the risk of being disengaged.

In the present disclosure, the thickness direction of the cover body 1 is up and down. As shown in FIG. 15, the driver member is provided with a plurality of grooves in the up-down direction, and the plurality of grooves are arranged at intervals in sequence, thereby reducing the weight of the pot cover assembly.

Figure 5:
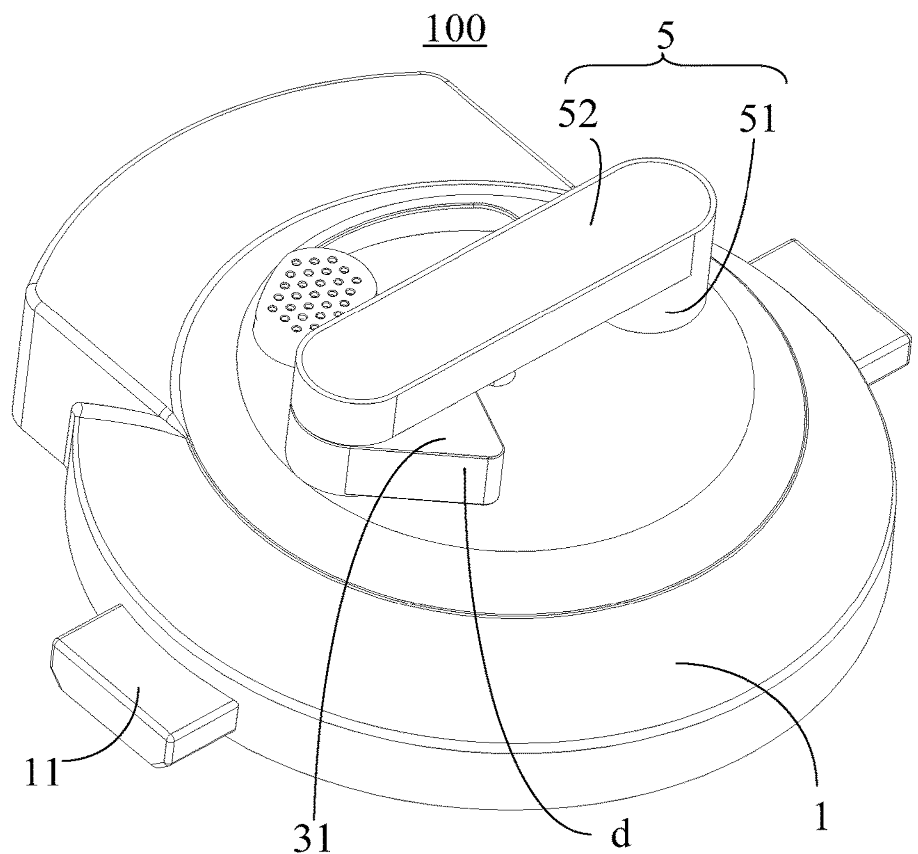
FIG. 5 is a schematic structural diagram of a retractable member in the unlocking position in FIG. 2.
Figure 6:
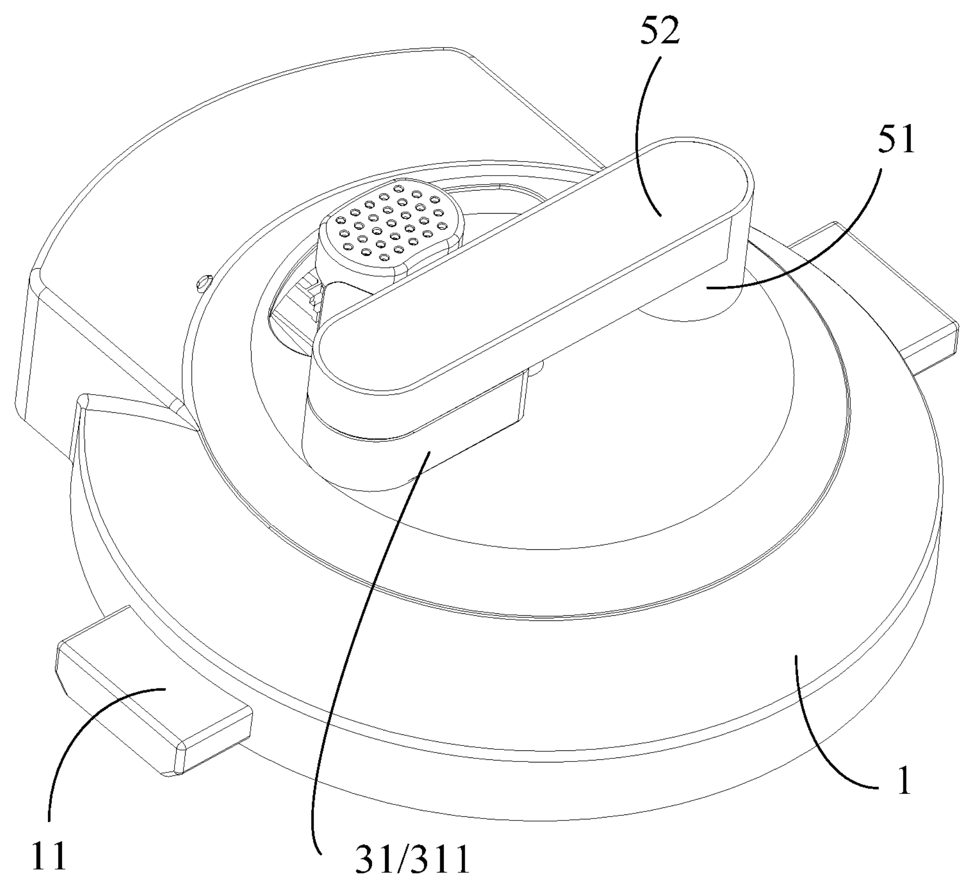
FIG. 6 is a schematic structural diagram of a retractable member in the locking position in FIG. 2.

Considering that when the retractable member 2 is in the unlocking position for unlocking the pot body 200, in order to facilitate taking and placing the pot cover assembly 100, a handle 5 is provided outside the cover body 1, and the driver member 31 is rotatably mounted at the handle 5. In this way, when it is necessary to separate the pot cover assembly 100 from the pot body 200, the operator's fingers press against the driver member 31 to rotate the driver member 31, so that the retractable member 2 is in the unlocking position (as shown in FIG. 5), the operator can hold the handle 5 to separate the pot cover assembly 100 from the pot body 200. When the cooking utensil needs to be moved and transported, the retractable member 2 is in the locking position (as shown in FIG. 6), the pot cover assembly 100 is locked with the pot body 200, so that the operator can carry the cooking utensil to the position where it needs to be placed by holding the handle 5. Besides, since the driver member 31 is rotatably mounted at the handle 5, when the operator's hand holds the handle 5, the fingers of the hand holding the handle 5 push the driver member 31 to rotate, thus the pot cover can be opened with one hand, which is convenient to operate, and does not require the joints of the wrist to twist to open the pot cover.

In order to avoid slippage when the finger pushes the driver member 31 to rotate, the driver member 31 has two operation sides d in a rotation direction thereof (as shown in FIG. 5, and FIG. 9 to FIG. 11), and the two operation sides d of the driver member 31 are provided with anti-slip structures a. Through the anti-slip effect of the anti-slip structure a, when a finger is in contact with the driving block 311 to drive the driving block 311 to rotate, slippage is avoided, and operation inconvenience is avoided.

The anti-slip structure a can be of various types. For example, the anti-slip structure a may include a plurality of anti-slip protrusions arranged at intervals, or the anti-slip structure may include an anti-slip rubber pad, etc., which is not limited in the present disclosure.

Figure 4:
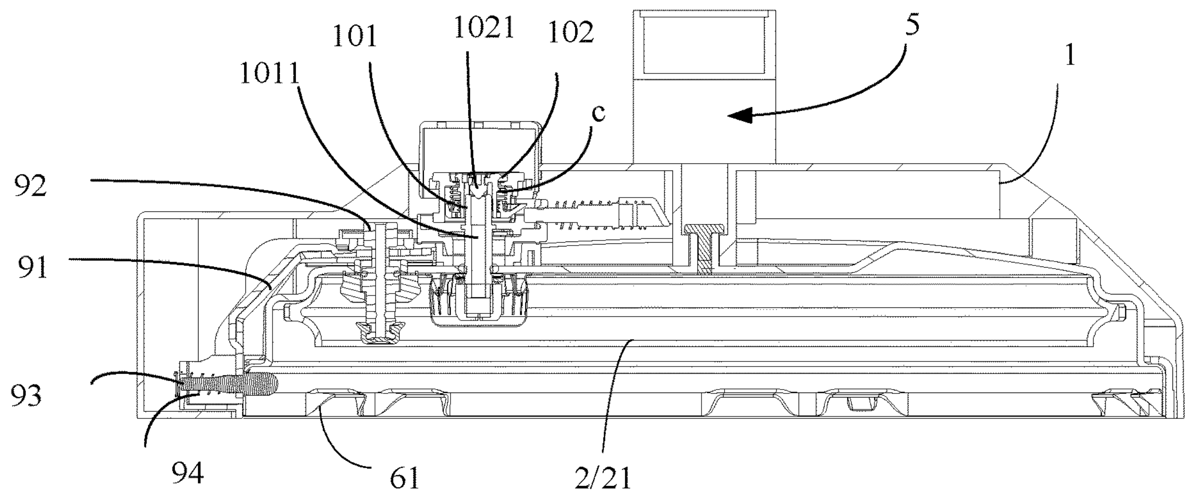
FIG. 4 is a schematic sectional view taken along B-B in FIG. 2.

As shown in FIG. 4 and FIG. 5, the handle 5 includes a connection member 51 protruding from an outer side of the cover body 1, and a hold member 52 extending laterally from the connection member 51. One end of the driver member 31 is rotatably mounted at the connection member 51. In this way, when it is necessary to separate the pot cover assembly 100 from the pot body 200, the operator's hand holds the hold member 52, so that the fingers are pressed against the driver member 31 to rotate the driver member 31. Thus, the pot cover can be opened with one hand, which is convenient to operate, and does not require the joints of the wrist to twist to open the pot cover.

Further, the driver member 31 is provided inside the hold member 52, such that during the rotation stroke of the driver member 31, the driver member 31 can be rotated to and accommodated in the projection area hidden in the hold member 52, which increases the aesthetics of the pot cover assembly 100.

Since the driver member 31 is provided inside the hold member 52, in order to facilitate the operator's fingers to abut the driver member 31, for example, a width of the driver member 31 is at least partially larger than or equal to a width of the hold member 52. In this embodiment, the width of the driver member 31 gradually increases in a direction away from an end of the driver member 31 that is rotatably mounted with the connection member 51. In this way, when the operator's hand is holding the hold member 52, the fingers can directly contact the driving block 311 to avoid wrist rotation. The operation is simple, the burden on the hand holding the handle 5 is reduced, and the appearance of the pot cover assembly 100 is more beautiful.

Figure 7:
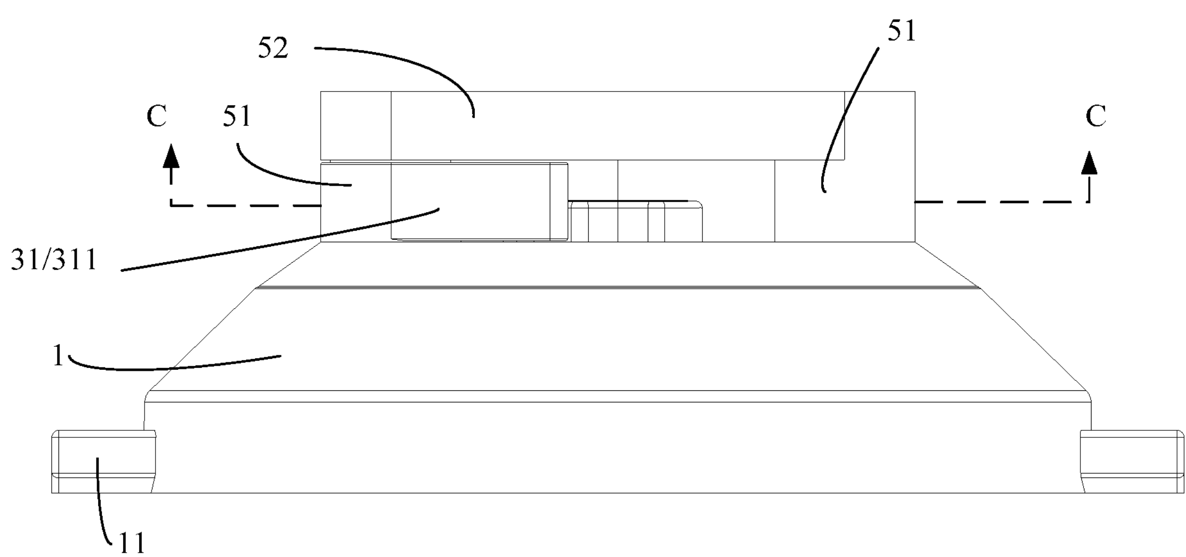
FIG. 7 is a schematic front view of the pot cover assembly in FIG. 2.

As shown in FIG. 6 and FIG. 7, in this embodiment, there are two connection members 51. One of the two connection members 51 is rotatably mounted with the driver member 31. The hold member 52 is located between the two connection members 51, both ends of the hold member 52 are connected to the two connection members 51 respectively, so that the handle 5 is firmly connected to the cover body 1. The two connection members 51 restrict the operator's movement along the length direction of the handle 5, so as to prevent the pot cover assembly 100 separated from the pot body 200 from being dropped and damaged due to hand slippage.

In order to prevent the operator from slipping when holding the handle 5, an anti-slip rubber pad, an anti-slip protrusion, or the like may also be provided at the hold member 52, which is not limited in the present disclosure.

There are many ways to fasten the cover body 1 and the pot body 200. A movable buckle may be provided at the cover body 1, and a clamping slot is provided at the pot body 200. By driving the movement of the buckle, the buckle is snapped into the clamping slot to realize the buckle. It is also possible to set the pot teeth on the pot body 200, and set the buckle teeth on the cover body 1, and rotate the cover body 1, so that the pot teeth and the buckle teeth cooperate and fasten together. As shown in FIG. 5 and FIG. 6, in this embodiment, the retractable member 2 includes an inner cover 21 rotatably mounted at the inner side of the cover body 1. The inner cover 21 is rotatable relative to the cover body 1. The periphery of the inner cover 21 is provided with buckle teeth 61 for engaging with the pot body 200. When the inner cover 21 is rotated to a certain angle, the buckle teeth 61 are engaged with the corresponding pot teeth on the pot body 200. When the inner cover 21 is rotated in the reverse direction, and the pot teeth and the buckle teeth 61 are staggered, so that the cover body 1 and the pot body 200 can be separated. The transmission mechanism is configured to convert the rotation of the driver member 31 into the rotation of the inner cover 21, and the operation is convenient.

In order to facilitate the alignment of the pot cover assembly 100 and the pot body 200, as shown in FIG. 1, a limiting structure 11 is provided at the periphery of the cover body 1. The cover body 1 can be quickly aligned with the pot body 200 through the cooperation between the limiting structure 11 and the pot body 200. Besides, during the process of switching between the locking position and the unlocking position, the pot body 200 does not rotate. Through the cooperation between the limiting structure 11 and the pot body 200, the rotation of the cover body 1 relative to the pot body 200 is restricted, so that the cover body 1 and the pot body 200 are relatively stationary. Since the handle 5 is provided outside the cover body 1, the handle 5 only has the function of holding, and the cover cannot be opened by turning the handle, so the operator does not need to twist the wrist.

The limiting structure 11 is configured as a limit member. The pot body 200 is provided with a match member 202 corresponding to the limit member. One of the limit member and the match member 202 is configured as a limiting clamping protrusion, and the other of the limit member and the match member 202 is configured as a clamping slot. The limiting clamping protrusion and the clamping slot are installed together, so that the cover body 1 and the pot body 200 can be quickly aligned, and the cover body 1 and the pot body 200 can be relatively stationary.

As shown in FIG. 4, the pot cover assembly 100 includes an exhaust valve assembly and a self-locking assembly. The self-locking assembly includes a slider 91. The exhaust valve assembly includes a valve core 101, a valve body 102 and a housing fixed on the cover body 1. The exhaust valve assembly further includes a valve seat. The housing is provided with an accommodation member for accommodating the valve seat, and the inner wall of the accommodation member is provided with a guide groove. The valve seat is elastically connected with the cover body 1. The valve seat is provided with a bumping that fits with the guide groove and moves along the guide groove. The valve seat extends outward with an extension member. The extension member is provided with a buckle adapted to the slider 91, and the valve seat is also provided with an abutment member. When the buckle is engaged with the slider 91, the abutment member has a gap with the valve body 102. When the buckle is disengaged from the slider 91, the abutment member abuts the valve body 102. The valve core 101 has exhaust holes 1011 running through both ends thereof. The valve body 102 is provided with a sealing block 1021 for sealing the exhaust hole 1011. A valve seat is added on the cover body 1, the housing is provided with an accommodation member for accommodating the valve seat, the valve seat is elastically connected with the cover body 1, and the inner wall of the accommodation member is provided with the guide groove. The outer wall of the valve seat is provided with the bumping that fits with the guide groove and moves along the guide groove, and the buckle that fits with the slider 91 of the cover body 1. The inner wall of the valve seat is provided with an abutment member for abutting against the valve body 102. The valve seat is elastically connected to the accommodation member through a spring c. When the buckle is engaged with the slider 91 in the self-locking assembly and located above the slider 91, the bumping moves along the guide groove, so that the abutment member does not bear or partially bears the gravity of the valve body 102. Then, the pressure applied by the sealing block 1021 to the valve core 101 is changed, so that the pressure-limiting range of the exhaust valve assembly can be adjusted, and the pressure-limiting pressure of the pot cover can be adjusted. Besides, since the buckle is engaged with the slider 91, the pressure limiting pressure of the exhaust valve assembly is changed. Therefore, when the pot cover is opened, the slider 91 will be disengaged from the buckle, so that the valve seat is reset under the action of the spring c, and the pressure limiting pressure of the pot cover is automatically reset, improving people's use experience.

The self-locking assembly also includes a float valve 92, a self-locking pin 93 and a return spring 94. The self-locking pins 93 are respectively connected with the slider 91 and the return spring 94 to control the slider 91 to slide radially along the cover body 1. The slider 91 is provided with a through hole which is adapted to the float valve 92. When the pressure in the cooking utensil is greater than the gravity of the float valve 92, the float valve 92 floats up under the action of the steam in the cooking cavity of the cooking utensil, preventing the slider 91 from moving in the radial direction of the cover body 1, and the cover body 1 cannot be opened. When the pressure in the cooking cavity of the cooking utensil is lower than the gravity of the float valve 92, the float valve 92 sinks under its own gravity, the slider 91 can move in the radial direction of the cover body 1, and the cover body 1 can be opened at this time.

The present disclosure further provides a cooking utensil. As shown in FIG. 1, a cooking utensil 1000 includes the above-described pot cover assembly 100. The pot cover assembly 100 is the above-described pot cover assembly 100. That is, the cooking utensil 1000 includes the pot cover assembly 100. For the specific structure of the pot cover assembly 100, reference can be made to the above-described embodiments. Since the cooking utensil 1000 adopts all the technical solutions of all the above-described embodiments, it at least has all the beneficial effects brought by all the technical solutions of all the above-described embodiments, which will not be repeated here.

The specific expression form of the cooking utensils provided in the present disclosure is not limited. The cooking utensil in this embodiment is described by taking pressure cooking utensil as an example. The pressure cooking utensil includes a pot cover assembly 100 and a pot body 200. Buckling teeth 61 are provided at the periphery of the retractable member 2 of the pot cover assembly 100. The pot body 200 has a cavity with an upward opening. The periphery of the opening is provided with pot teeth that are buckled with the buckle teeth 61. During use, the driver member 31 is pushed to move, so that the retractable member 2 moves, to make the retractable member 2 switch between the locking position where the locking teeth 61 are engaged with the pot teeth, and the unlocking position where the locking teeth 61 are separated from the pot teeth. In this way, the user only needs to push the driver member 31 with fingers to realize the locking and unlocking of the pot cover assembly 100.

The above are only some embodiments of the present disclosure, and do not limit the scope of the present disclosure thereto. Under the concept of the present disclosure, equivalent structural transformations made according to the description and drawings of the present disclosure, or direct/indirect application in other related technical fields are included in the scope of the present disclosure.

What is claimed is:

1. A pot cover assembly comprising:

a cover body;

a retractable member movably provided inside the cover body, the retractable member having, in a movement stroke of the retractable member, a locking position for locking a pot body and an unlocking position for unlocking the pot body; and a driver assembly including:

a driver member rotatably provided outside the cover body along an axis extending in a thickness direction of the cover body; and a transmission mechanism transmissively connecting the driver member and the retractable member, the transmission mechanism being configured to convert a rotation of the driver member into a movement of the retractable member, and the transmission mechanism including a driving gear member drivingly connected to the driver member to be driven to rotate by the driver member, and a driven gear member drivingly connected to the retractable member and meshed with the driving gear member to drive the retractable member to rotate;

wherein:

the retractable member is provided with two rotation-stop members spaced apart from each other; and a side of the driving gear member is provided with a limit member, and the limit member is configured to selectively abut against one of the two rotation-stop members in a rotation stroke of the limit member.

2. The pot cover assembly of claim 1, wherein:

the retractable member is rotatably mounted inside the cover body;

the transmission mechanism further includes a drive slot and a drive column matching the drive slot;

the drive slot extends in a direction forming an included angle with a line passing through a center of the retractable member, and is in an elongated shape; and one of the drive slot and the drive column is provided at the driver member, and another one of the drive slot and the drive column is provided at the retractable member.

3. The pot cover assembly of claim 1, wherein:

the retractable member is rotatably mounted inside the cover body.

4. The pot cover assembly of claim 1, wherein:

the driving gear member includes:

a driving body drivingly connected to the driver member; and a plurality of driving teeth provided at a side of the driving body;

the driven gear member includes:

a driven body drivingly connected to the retractable member; and a plurality of driven teeth provided at a side of the driven body; and some of the plurality of driven teeth are selectively meshed with some of the plurality of driving teeth.

5. The pot cover assembly of claim 1, wherein:

the driver member matches the driving gear member to prevent relative rotation between the driver member and the driving gear member.

6. The pot cover assembly of claim 1, wherein:

the driven gear member matches the retractable member to prevent relative rotation between the driven gear member and the retractable member.

7. The pot cover assembly of claim 1, wherein the driver member has two operation sides in a rotation direction of the driver member, and each of the two operation sides of the driver member is provided with an anti-slip structure.

8. The pot cover assembly of claim 1, further comprising:

a handle provided outside the cover body;

wherein the driver member is rotatably mounted on the handle.

9. The pot cover assembly of claim 8, wherein the driver member has two operation sides in a rotation direction of the driver member, and each of the two operation sides of the driver member is provided with an anti-slip structure.

10. The pot cover assembly of claim 8, wherein:

the handle includes:

a connection member protruding from an outer side of the cover body; and a hold member extending laterally from the connection member; and one end of the driver member is rotatably mounted on the connection member.

11. The pot cover assembly of claim 10, wherein the driver member is located between the hold member and the cover body.

12. The pot cover assembly of claim 11, wherein a width of the driver member gradually increases in a direction away from an end of the driver member that is rotatably mounted with the connection member.

13. The pot cover assembly of claim 1, wherein:

the retractable member includes an inner cover rotatably mounted inside the cover body, and the transmission mechanism is configured to convert the rotation of the driver member into a rotation of the inner cover.

14. A cooking utensil comprising:

a pot cover assembly including:

a cover body;

a retractable member movably provided inside the cover body, the retractable member having, in a movement stroke of the retractable member, a locking position for locking a pot body and an unlocking position for unlocking the pot body; and a driver assembly including:

a driver member rotatably provided outside the cover body along an axis extending in a thickness direction of the cover body; and a transmission mechanism transmissively connecting the driver member and the retractable member, the transmission mechanism being configured to convert a rotation of the driver member into a movement of the retractable member, and the transmission mechanism including a driving gear member drivingly connected to the driver member to be driven to rotate by the driver member, and a driven gear member drivingly connected to the retractable member and meshed with the driving gear member to drive the retractable member to rotate;

wherein:

the retractable member is provided with two rotation-stop members spaced apart from each other; and a side of the driving gear member is provided with a limit member, and the limit member is configured to selectively abut against one of the two rotation-stop members in a rotation stroke of the limit member.

15. The cooking utensil of claim 14, wherein the cooking utensil includes an electric pressure cooker.

16. The cooking utensil of claim 14, wherein:

the retractable member is rotatably mounted inside the cover body;

the transmission mechanism further includes a drive slot and a drive column matching the drive slot;

the drive slot extends in a direction forming an included angle with a line passing through a center of the retractable member, and is in an elongated shape; and one of the drive slot and the drive column is provided at the driver member, and another one of the drive slot and the drive column is provided at the retractable member.

17. The cooking utensil of claim 14, wherein:

the retractable member is rotatably mounted inside the cover body.

18. The cooking utensil of claim 14, wherein:

the driving gear member includes:

a driving body drivingly connected to the driver member; and a plurality of driving teeth provided at a side of the driving body;

the driven gear member includes:

a driven body drivingly connected to the retractable member; and a plurality of driven teeth provided at a side of the driven body; and some of the plurality of driven teeth are selectively meshed with some of the plurality of driving teeth.

19. A pot cover assembly comprising:

a cover body;

a retractable member movably provided inside the cover body, the retractable member having, in a movement stroke of the retractable member, a locking position for locking a pot body and an unlocking position for unlocking the pot body, and the retractable member being rotatably mounted inside the cover body; and a driver assembly including:

a driver member rotatably provided outside the cover body along an axis extending in a thickness direction of the cover body; and a transmission mechanism transmissively connecting the driver member and the retractable member, the transmission mechanism being configured to convert a rotation of the driver member into a movement of the retractable member, and the transmission mechanism including a driving gear member drivingly connected to the driver member to be driven to rotate by the driver member, and a driven gear member drivingly connected to the retractable member and meshed with the driving gear member to drive the retractable member to rotate;

wherein:

the driving gear member includes:

a driving body drivingly connected to the driver member; and a plurality of driving teeth provided at a side of the driving body;

the driven gear member includes:

a driven body drivingly connected to the retractable member; and a plurality of driven teeth provided at a side of the driven body;

some of the plurality of driven teeth are selectively meshed with some of the plurality of driving teeth;

the retractable member is provided with two rotation-stop members spaced apart from each other; and a side of the driving gear member is provided with a limit member, and the limit member is configured to selectively abut against one of the two rotation-stop members in a rotation stroke of the limit member.

* * * * *